US011172273B2

(12) United States Patent
Foster et al.

(10) Patent No.: US 11,172,273 B2
(45) Date of Patent: Nov. 9, 2021

(54) TRANSFORMER MONITOR, COMMUNICATIONS AND DATA COLLECTION DEVICE

(71) Applicant: Delta Energy & Communications, LLC, Murrieta, CA (US)

(72) Inventors: Scott Foster, Murrieta, CA (US); Angelo Borrelli, Fairhope, AL (US); Keith Teichmann, Newton Centre, MA (US)

(73) Assignee: DELTA ENERGY & COMMUNICATIONS, INC., Murrieta, CA (US)

( * ) Notice: Subject to any disclaimer, the term of this patent is extended or adjusted under 35 U.S.C. 154(b) by 0 days.

(21) Appl. No.: 15/160,754

(22) Filed: May 20, 2016

(65) Prior Publication Data

US 2017/0048598 A1 Feb. 16, 2017

Related U.S. Application Data

(60) Provisional application No. 62/203,101, filed on Aug. 10, 2015.

(51) Int. Cl.
*H04Q 9/00* (2006.01)
*H02J 50/12* (2016.01)
*H02J 13/00* (2006.01)

(52) U.S. Cl.
CPC .......... *H04Q 9/00* (2013.01); *H02J 13/0075* (2013.01); *H02J 50/12* (2016.02);
(Continued)

(58) Field of Classification Search
CPC ....... H04W 4/26; H04Q 9/00; H04Q 2209/40; H04Q 2209/60; H02J 50/12; H02J 13/0075; Y02E 60/74; Y04S 10/30
See application file for complete search history.

(56) References Cited

U.S. PATENT DOCUMENTS

| 2,704,809 A | 3/1955 | Williams |
| 4,724,381 A * | 2/1988 | Crimmins ............. G01R 15/26 |
| | | 324/127 |

(Continued)

FOREIGN PATENT DOCUMENTS

| CN | 101860978 | 10/2010 |
| CN | 102255869 | 11/2011 |

(Continued)

OTHER PUBLICATIONS

Gridsense, "Maximize Intelligence and Minimize Costs at the Distribution Level," http://www.gridsense.com/solutions-products/transformer-monitoring/distribution-transformer-monitoring/, accessed Oct. 13, 2015, 3 pages.

(Continued)

*Primary Examiner* — Amine Benlagsir
(74) *Attorney, Agent, or Firm* — Ware, Fressola, Maguire & Barber LLP (57) ABSTRACT

A transformer monitor, communication and data collection device features a signal processor configured to receive signaling containing information about collected data, including some combination of electrical signaling data related to electrical signaling being processed by a transformer located and arranged in a grid network and to which the apparatus is mounted, metered data related to associated electrical signaling being provided from the transformer to a building or structure in the grid network, and other wireless network data related to other wireless network communication devices/nodes/end points deployed in the grid network; and determine corresponding signaling containing information about collected data for transmitting back to a central location or other connection device for further processing, based upon the signaling received.

22 Claims, 7 Drawing Sheets

Example of Network having Residential and Commercial Structures with Transformer Monitor / Data Collector Device (52) U.S. Cl.
CPC ..... *H04Q 2209/40* (2013.01); *H04Q 2209/60* (2013.01); *Y02E 60/00* (2013.01); *Y04S 10/30* (2013.01)

(56) References Cited

U.S. PATENT DOCUMENTS

| | | | |
|---|---|---|---|
| 5,426,360 A | 6/1995 | Maraio et al. | |
| 5,748,104 A | 5/1998 | Argyroudis et al. | |
| 5,940,009 A | 8/1999 | Loy et al. | |
| 6,018,449 A | 1/2000 | Nelson et al. | |
| 6,211,764 B1 * | 4/2001 | Schweitzer, Jr. | ... H01F 27/2804 336/176 |
| 6,300,881 B1 | 10/2001 | Yee et al. | |
| 6,549,120 B1 | 4/2003 | de Buda | |
| 6,711,512 B2 | 3/2004 | Noh | |
| 6,829,491 B1 | 12/2004 | Yea et al. | |
| 6,856,256 B2 | 2/2005 | Winkler | |
| 6,880,086 B2 | 4/2005 | Kidder et al. | |
| 6,906,630 B2 | 6/2005 | Georges et al. | |
| 6,998,962 B2 | 2/2006 | Cope et al. | |
| 7,049,976 B2 | 5/2006 | Hunt et al. | |
| 7,054,770 B2 | 5/2006 | Swarztrauber et al. | |
| 7,058,524 B2 | 6/2006 | Hayes et al. | |
| 7,107,329 B1 | 9/2006 | Schroder et al. | |
| 7,126,558 B1 | 10/2006 | Dempski | |
| 7,271,735 B2 | 9/2007 | Rogai | |
| 7,304,587 B2 | 12/2007 | Boaz | |
| 7,310,052 B2 | 12/2007 | Bowman | |
| 7,379,981 B2 | 5/2008 | Elliott et al. | |
| 7,402,993 B2 | 7/2008 | Morrison | |
| 7,440,436 B2 | 10/2008 | Cheng et al. | |
| 7,496,078 B2 | 2/2009 | Rahman | |
| 7,733,839 B1 | 6/2010 | Frank et al. | |
| 7,747,534 B2 | 6/2010 | Villicana et al. | |
| 7,764,943 B2 | 7/2010 | Radtke | |
| 7,894,371 B2 | 2/2011 | Bonta et al. | |
| 7,936,163 B2 | 5/2011 | Lee, Jr. | |
| 7,940,039 B2 | 5/2011 | de Buda | |
| 7,961,740 B2 | 6/2011 | Flammer, III et al. | |
| 8,054,199 B2 | 11/2011 | Addy | |
| 8,060,259 B2 | 11/2011 | Budhraja et al. | |
| 8,102,148 B2 | 1/2012 | Hershey et al. | |
| 8,111,157 B2 | 2/2012 | Diener et al. | |
| 8,121,741 B2 | 2/2012 | Taft et al. | |
| 8,145,732 B2 | 3/2012 | Kumar et al. | |
| 8,194,275 B2 | 6/2012 | Furst et al. | |
| 8,279,870 B2 | 10/2012 | Flammer, III et al. | |
| 8,305,932 B2 | 11/2012 | Qiu et al. | |
| 8,311,863 B1 | 11/2012 | Kemp | |
| 8,370,697 B2 | 2/2013 | Veillette | |
| 8,373,575 B2 | 2/2013 | Boettner et al. | |
| 8,385,978 B2 | 2/2013 | Leung et al. | |
| 8,401,709 B2 | 3/2013 | Cherian et al. | |
| 8,412,735 B2 | 4/2013 | Yeh et al. | |
| 8,423,637 B2 | 4/2013 | Vaswani et al. | |
| 8,428,021 B2 | 4/2013 | Karunakaran et al. | |
| 8,437,883 B2 | 5/2013 | Powell et al. | |
| 8,441,372 B2 | 5/2013 | Smith et al. | |
| 8,452,555 B2 | 5/2013 | Swarztrauber et al. | |
| 8,509,953 B2 | 8/2013 | Taft | |
| 8,543,250 B2 | 9/2013 | Seo et al. | |
| 8,553,561 B1 | 10/2013 | Chokshi et al. | |
| 8,566,046 B2 | 10/2013 | Deaver, Sr. | |
| 8,583,520 B1 | 11/2013 | Forbes, Jr. | |
| 8,600,572 B2 | 12/2013 | Sri-Jayantha | |
| 8,660,868 B2 | 2/2014 | Vogel et al. | |
| 8,755,303 B2 | 6/2014 | Hughes et al. | |
| 8,792,626 B2 | 7/2014 | Cook et al. | |
| 8,847,826 B2 | 9/2014 | Rao et al. | |
| 8,855,102 B2 | 10/2014 | Borleske et al. | |
| 8,862,281 B2 | 10/2014 | Yoneda et al. | |
| 8,874,477 B2 | 10/2014 | Hoffberg | |
| 8,880,234 B2 | 11/2014 | Sekoguchi et al. | |
| 8,909,358 B2 | 12/2014 | Karnouskos | |
| 8,917,716 B2 | 12/2014 | Tran | |
| 8,937,497 B1 | 1/2015 | Tobin | |
| 8,959,114 B2 | 2/2015 | Rehman | |
| 8,963,807 B1 | 2/2015 | Lee et al. | |
| 8,964,757 B2 | 2/2015 | Watson et al. | |
| 8,965,590 B2 | 2/2015 | Boardman et al. | |
| 8,970,394 B2 | 3/2015 | Veillette | |
| 9,002,670 B2 | 4/2015 | Hurri et al. | |
| 9,013,173 B2 | 4/2015 | Veillette | |
| 9,014,996 B2 | 4/2015 | Kamel et al. | |
| 9,031,116 B2 | 5/2015 | Young et al. | |
| 9,043,174 B2 | 5/2015 | Arya et al. | |
| 9,052,216 B2 | 6/2015 | Kamel et al. | |
| 9,087,451 B1 | 7/2015 | Jarrell | |
| 9,110,101 B2 | 8/2015 | Pietrowicz et al. | |
| 9,112,381 B2 | 8/2015 | Carralero et al. | |
| 9,118,219 B2 | 8/2015 | Booth | |
| 9,129,355 B1 | 9/2015 | Harvey et al. | |
| 9,141,653 B2 | 9/2015 | Zhou et al. | |
| 9,144,082 B2 | 9/2015 | Rubin et al. | |
| 9,162,753 B1 | 10/2015 | Panto et al. | |
| 9,400,192 B1 | 7/2016 | Salser, Jr. et al. | |
| 9,400,867 B2 | 7/2016 | Boyd et al. | |
| 9,402,292 B1 | 7/2016 | Gordin et al. | |
| 9,451,060 B1 | 9/2016 | Bowers et al. | |
| 9,500,716 B2 | 11/2016 | Turner et al. | |
| 9,654,173 B2 | 5/2017 | Barzegar et al. | |
| 9,961,572 B2 | 5/2018 | Foster et al. | |
| 10,055,869 B2 | 8/2018 | Borrelli et al. | |
| 10,055,966 B2 | 8/2018 | Foster et al. | |
| 2001/0038342 A1 | 11/2001 | Foote | |
| 2002/0046368 A1 | 4/2002 | Friedrich et al. | |
| 2002/0064010 A1 | 5/2002 | Nelson et al. | |
| 2002/0106018 A1 | 8/2002 | D'Luna et al. | |
| 2003/0050737 A1 | 3/2003 | Osann, Jr. | |
| 2003/0078996 A1 | 4/2003 | Baldwin | |
| 2003/0128149 A1 | 7/2003 | Miceli et al. | |
| 2004/0057491 A1 | 3/2004 | Stenestam | |
| 2004/0082203 A1 | 4/2004 | Logvinov et al. | |
| 2005/0078624 A1 | 4/2005 | Shu et al. | |
| 2005/0088299 A1 | 4/2005 | Bandy et al. | |
| 2006/0007016 A1 | 1/2006 | Borkowski et al. | |
| 2006/0056363 A1 | 3/2006 | Ratiu et al. | |
| 2006/0141940 A1 | 6/2006 | Bloom et al. | |
| 2006/0145834 A1 * | 7/2006 | Berkman | ............... G01D 4/004 340/538.17 |
| 2007/0043849 A1 | 2/2007 | Lill et al. | |
| 2007/0048702 A1 | 3/2007 | Jang et al. | |
| 2007/0088630 A1 | 4/2007 | MacLeod et al. | |
| 2007/0229295 A1 | 10/2007 | Curt et al. | |
| 2008/0065342 A1 | 3/2008 | Zalitzky et al. | |
| 2008/0100436 A1 | 5/2008 | Banting et al. | |
| 2008/0106425 A1 | 5/2008 | Deaver et al. | |
| 2008/0109387 A1 | 5/2008 | Deaver et al. | |
| 2008/0272934 A1 | 11/2008 | Wang et al. | |
| 2008/0317047 A1 | 12/2008 | Zeng et al. | |
| 2009/0003662 A1 | 1/2009 | Joseph et al. | |
| 2009/0088907 A1 | 4/2009 | Lewis et al. | |
| 2009/0102680 A1 | 4/2009 | Roos | |
| 2009/0111456 A1 | 4/2009 | Shaffer et al. | |
| 2009/0119068 A1 | 5/2009 | Banting | |
| 2009/0135836 A1 | 5/2009 | Veillette | |
| 2009/0146839 A1 | 6/2009 | Reddy et al. | |
| 2009/0167558 A1 | 7/2009 | Borleske et al. | |
| 2009/0187284 A1 | 7/2009 | Kreiss et al. | |
| 2009/0240449 A1 | 9/2009 | Gibala et al. | |
| 2009/0256686 A1 | 10/2009 | Abbot et al. | |
| 2009/0267792 A1 | 10/2009 | Crichlow | |
| 2009/0312881 A1 | 12/2009 | Venturini Cheim et al. | |
| 2010/0074176 A1 | 3/2010 | Flammer, III et al. | |
| 2010/0278187 A1 | 11/2010 | Hart et al. | |
| 2010/0313146 A1 | 12/2010 | Nielsen et al. | |
| 2011/0026500 A1 | 2/2011 | Shaffer et al. | |
| 2011/0047230 A1 | 2/2011 | McGee | |
| 2011/0066297 A1 | 3/2011 | Saberi et al. | |
| 2011/0090833 A1 | 4/2011 | Kneckt et al. | |
| 2011/0095867 A1 | 4/2011 | Ahmad | |
| 2011/0208367 A1 | 8/2011 | Sackman et al. | |
| 2011/0255417 A1 | 10/2011 | Mohan et al. | |
| 2012/0007885 A1 | 1/2012 | Huston | |

(56) References Cited

U.S. PATENT DOCUMENTS

| | | |
|---|---|---|
| 2012/0029897 A1 | 2/2012 | Cherian et al. |
| 2012/0050971 A1 | 3/2012 | Seal et al. |
| 2012/0058790 A1 | 3/2012 | Junnell et al. |
| 2012/0059609 A1 | 3/2012 | Oh et al. |
| 2012/0078686 A1 | 3/2012 | Bashani |
| 2012/0089268 A1 | 4/2012 | Torre et al. |
| 2012/0092114 A1 | 4/2012 | Matthews |
| 2012/0106394 A1 | 5/2012 | Apostolakis |
| 2012/0126790 A1 | 5/2012 | Sobotka et al. |
| 2012/0126994 A1 | 5/2012 | Sobotka et al. |
| 2012/0131324 A1 | 5/2012 | Ansari et al. |
| 2012/0229089 A1 | 9/2012 | Bemmel et al. |
| 2012/0229296 A1 | 9/2012 | Ree |
| 2012/0230237 A1 | 9/2012 | Gong et al. |
| 2012/0242698 A1 | 9/2012 | Haddick et al. |
| 2012/0249741 A1 | 10/2012 | Maciocci et al. |
| 2012/0253881 A1 | 10/2012 | Schneider et al. |
| 2012/0265355 A1 | 10/2012 | Bernheim et al. |
| 2012/0277926 A1 | 11/2012 | Nielsen et al. |
| 2012/0286770 A1 | 11/2012 | Schroder et al. |
| 2012/0297481 A1 | 11/2012 | Boot et al. |
| 2012/0303746 A1 | 11/2012 | Yu et al. |
| 2012/0316688 A1 | 12/2012 | Boardman et al. |
| 2012/0316696 A1 | 12/2012 | Boardman et al. |
| 2013/0026986 A1 | 1/2013 | Parthasarathy et al. |
| 2013/0035802 A1 | 2/2013 | Khaitan et al. |
| 2013/0069985 A1 | 3/2013 | Wong et al. |
| 2013/0077610 A1 | 3/2013 | Amini et al. |
| 2013/0103660 A1 | 4/2013 | Welsh et al. |
| 2013/0106617 A1 | 5/2013 | Heo et al. |
| 2013/0110837 A1 | 5/2013 | Dai et al. |
| 2013/0123998 A1 | 5/2013 | King et al. |
| 2013/0190939 A1 | 7/2013 | Lenox |
| 2013/0203378 A1 | 8/2013 | Vos et al. |
| 2013/0218495 A1 | 8/2013 | Boone et al. |
| 2013/0222215 A1 | 8/2013 | Kobayashi |
| 2013/0223334 A1 | 8/2013 | Guo et al. |
| 2013/0278437 A1 | 10/2013 | Wyk |
| 2013/0278631 A1 | 10/2013 | Border et al. |
| 2013/0289782 A1 | 10/2013 | Giroti |
| 2013/0297087 A1 | 11/2013 | Koster et al. |
| 2013/0297239 A1 | 11/2013 | Arya et al. |
| 2013/0297868 A1 | 11/2013 | Yin et al. |
| 2013/0304264 A1 | 11/2013 | Shao |
| 2013/0315057 A1 | 11/2013 | Popa et al. |
| 2013/0335062 A1 | 12/2013 | de Buda et al. |
| 2014/0067330 A1 | 3/2014 | Flammer, III |
| 2014/0092765 A1 | 4/2014 | Agarwal et al. |
| 2014/0098685 A1 | 4/2014 | Shattil |
| 2014/0129160 A1 | 5/2014 | Tran |
| 2014/0167977 A1 | 6/2014 | Bean et al. |
| 2014/0172133 A1 | 6/2014 | Snyder |
| 2014/0183964 A1 | 7/2014 | Walley |
| 2014/0189722 A1 | 7/2014 | Shetty |
| 2014/0233620 A1 | 8/2014 | Bernheim et al. |
| 2014/0237525 A1 | 8/2014 | Rothschild et al. |
| 2014/0241354 A1 | 8/2014 | Shuman et al. |
| 2014/0244017 A1 | 8/2014 | Freiwirth et al. |
| 2014/0244768 A1 | 8/2014 | Shuman et al. |
| 2014/0244833 A1 | 8/2014 | Sharma et al. |
| 2014/0259108 A1 | 9/2014 | Clark et al. |
| 2014/0267400 A1 | 9/2014 | Mabbutt et al. |
| 2014/0270749 A1 | 9/2014 | Miniscalo et al. |
| 2014/0277813 A1 | 9/2014 | Powell et al. |
| 2014/0279694 A1 | 9/2014 | Gauger et al. |
| 2014/0289004 A1* | 9/2014 | Monforte ........... G06Q 30/0202 705/7.31 |
| 2014/0297206 A1 | 10/2014 | Silverman |
| 2014/0300210 A1 | 10/2014 | Abi-Ackel et al. |
| 2014/0300344 A1 | 10/2014 | Turner et al. |
| 2014/0306525 A1 | 10/2014 | Greer et al. |
| 2014/0312802 A1 | 10/2014 | Recker et al. |
| 2014/0320306 A1 | 10/2014 | Winter |
| 2014/0334073 A1 | 11/2014 | Thompson et al. |
| 2014/0358315 A1 | 12/2014 | Liu et al. |
| 2014/0361907 A1* | 12/2014 | Bernheim ............ H04B 3/546 340/870.02 |
| 2014/0368189 A1 | 12/2014 | Bernheim et al. |
| 2014/0371941 A1 | 12/2014 | Keller et al. |
| 2014/0372583 A1 | 12/2014 | Tseng |
| 2014/0376405 A1 | 12/2014 | Erickson et al. |
| 2014/0376914 A1 | 12/2014 | Miniscalo |
| 2014/0380488 A1 | 12/2014 | Datta Ray et al. |
| 2015/0002186 A1 | 1/2015 | Taft |
| 2015/0019342 A1 | 1/2015 | Gupta |
| 2015/0019553 A1 | 1/2015 | Shaashua et al. |
| 2015/0058445 A1 | 2/2015 | Choi et al. |
| 2015/0063202 A1 | 3/2015 | Mazzarella et al. |
| 2015/0066772 A1 | 3/2015 | Griffin et al. |
| 2015/0094874 A1 | 4/2015 | Hall et al. |
| 2015/0094968 A1 | 4/2015 | Jia et al. |
| 2015/0095936 A1 | 4/2015 | Yu et al. |
| 2015/0112469 A1 | 4/2015 | Da Silva Neto et al. |
| 2015/0121470 A1 | 4/2015 | Rongo et al. |
| 2015/0127601 A1 | 5/2015 | McGill et al. |
| 2015/0142963 A1 | 5/2015 | Choi et al. |
| 2015/0148979 A1 | 5/2015 | Forbes, Jr. |
| 2015/0149396 A1 | 5/2015 | Arya et al. |
| 2015/0155713 A1 | 6/2015 | Forbes, Jr. |
| 2015/0163849 A1 | 6/2015 | Bauer et al. |
| 2015/0179062 A1 | 6/2015 | Ralston et al. |
| 2015/0200713 A1 | 7/2015 | Hui et al. |
| 2015/0200846 A1 | 7/2015 | Hui et al. |
| 2015/0220762 A1 | 8/2015 | Jiang et al. |
| 2015/0249595 A1 | 9/2015 | Geiger |
| 2015/0256433 A1 | 9/2015 | Sum et al. |
| 2015/0256435 A1 | 9/2015 | Sum et al. |
| 2015/0276433 A1 | 10/2015 | Brahmajosyula et al. |
| 2015/0281996 A1 | 10/2015 | Rubin et al. |
| 2015/0288532 A1 | 10/2015 | Veyseh et al. |
| 2015/0288825 A1 | 10/2015 | Cook |
| 2015/0294557 A1 | 10/2015 | Willig et al. |
| 2015/0311951 A1 | 10/2015 | Hariz |
| 2015/0370615 A1 | 12/2015 | Pi-Sunyer |
| 2015/0373521 A1 | 12/2015 | Olesen et al. |
| 2015/0373641 A1 | 12/2015 | Yamana et al. |
| 2016/0029384 A1 | 1/2016 | Sidhu et al. |
| 2016/0081127 A1 | 3/2016 | Lee et al. |
| 2016/0094402 A1 | 3/2016 | Finkelstein |
| 2016/0094879 A1* | 3/2016 | Gerszberg .......... H04N 21/6118 725/71 |
| 2016/0134932 A1 | 5/2016 | Karp et al. |
| 2016/0198245 A1 | 7/2016 | Rhoads et al. |
| 2016/0205106 A1 | 7/2016 | Yacoub et al. |
| 2016/0214715 A1 | 7/2016 | Meffert |
| 2016/0261425 A1 | 9/2016 | Horton et al. |
| 2016/0292205 A1 | 10/2016 | Massey et al. |
| 2016/0327603 A1 | 11/2016 | Sonderegger et al. |
| 2016/0337354 A1 | 11/2016 | Smadja et al. |
| 2016/0360361 A1 | 12/2016 | Ross et al. |
| 2016/0366461 A1 | 12/2016 | Hu et al. |
| 2017/0003142 A1 | 1/2017 | Allcorn et al. |
| 2017/0108236 A1 | 4/2017 | Guan et al. |
| 2017/0134092 A1 | 5/2017 | Foster et al. |
| 2017/0223807 A1 | 8/2017 | Recker et al. |
| 2017/0237612 A1* | 8/2017 | Foster ................ H04L 41/0806 709/220 |
| 2017/0302511 A1* | 10/2017 | Foster ................ H04L 41/0803 |
| 2017/0339536 A1 | 11/2017 | Lewis et al. |
| 2018/0132015 A1 | 5/2018 | Borrelli et al. |
| 2018/0267494 A1 | 9/2018 | Meranda et al. |
| 2018/0366978 A1 | 12/2018 | Matan et al. |

FOREIGN PATENT DOCUMENTS

| | | |
|---|---|---|
| CN | 102355682 | 2/2012 |
| CN | 102412530 | 4/2012 |
| CN | 102508989 | 6/2012 |
| CN | 202513670 | 10/2012 |
| CN | 103078673 | 5/2013 |
| CN | 103209385 | 7/2013 |
| CN | 103313437 | 9/2013 |
| CN | 103488988 | 1/2014 |
| CN | 103810753 | 5/2014 |

(56) References Cited

FOREIGN PATENT DOCUMENTS

| | | |
|---|---|---|
| CN | 203965904 | 11/2014 |
| CN | 104238730 | 12/2014 |
| CN | 104333733 | 2/2015 |
| CN | 204142366 | 2/2015 |
| CN | 204203734 | 3/2015 |
| CN | 104485746 | 4/2015 |
| CN | 104581087 | 4/2015 |
| CN | 204465736 | 7/2015 |
| CN | 204595654 | 8/2015 |
| EP | 2296069 | 3/2011 |
| EP | 2818878 | 12/2014 |
| EP | 2721772 | 10/2015 |
| KR | 20130108769 A | 10/2013 |
| WO | 2009059386 | 5/2009 |
| WO | 2010003452 | 1/2010 |
| WO | 2011079358 | 7/2011 |
| WO | 2012047089 | 4/2012 |
| WO | 2012122454 | 9/2012 |
| WO | 2012142586 | 10/2012 |
| WO | 2012154938 | 11/2012 |
| WO | 2012155126 | 11/2012 |
| WO | 2013019595 | 2/2013 |
| WO | 2013028407 | 2/2013 |
| WO | 2013123445 | 8/2013 |
| WO | 2013173230 | 11/2013 |
| WO | WO 2013173230 A1 * 11/2013 ........... G01R 15/186 |
| WO | 2014056558 | 4/2014 |
| WO | 2014091434 | 6/2014 |
| WO | 2014118622 | 8/2014 |
| WO | 2014123737 | 8/2014 |
| WO | 2014124318 | 8/2014 |
| WO | 2014130568 | 8/2014 |
| WO | 2014169018 | 10/2014 |
| WO | 2014175721 | 10/2014 |
| WO | 2015032164 | 3/2015 |
| WO | 2015046695 | 4/2015 |
| WO | 2015073687 | 5/2015 |
| WO | 2015105658 | 7/2015 |
| WO | 2015123623 | 8/2015 |
| WO | 2015131462 | 9/2015 |
| WO | 2015138447 | 9/2015 |
| WO | 2015161083 | 10/2015 |

OTHER PUBLICATIONS

Balakrishnan et al., "Models for Planning Capacity Expansion in Local Access Telecommunication Networks," Massachusetts Institute of Technology Sloan School Working Paper #3048-89-MS, Aug. 1989, 88 pages.
Corte-Real et al., "Network flow models for the local access network expansion problem," Computers & Operations Research vol. 34, 2007, pp. 1141-1157.
Bauer, "Bundling, Differentiation, Alliances and Mergers: Convergence Strategies in U.S. Communication Markets," Communications & Strategies, No. 60, Dec. 2005, online at http://mpra.ub.uni-muenchen.de/2515/, pp. 59-93.
Balakrishnan et al., "Models for Planning the Evolution of Local Telecommunication Networks," Massachusetts Institute of Technology Operations Research Center working paper, OR195-89, May 1989, 80 pages.
"Smart meter," http://en.wikipedia,org/wiki/Smart_meter, Nov. 10, 2009, 4 pages.
Smart Grid Northwest, "Qualitrol," http://smartgridnw.org/membership/member-organizations/qualitrol/, accessed Oct. 13, 2015, 3 pages.
Devidas, A. R. and Ramesh, M. V., "Wireless Smart Grid Design for Monitoring and Optimizing Electric Transmission in India," 2010 Fourth International Conference on Sensor Technologies and Applications, Jul. 18-25, 2010, Venice, IEEE, pp. 637-640 (2 pages).
Erol-Kantarci, M. and Mouftah, H. T., "Wireless Multimedia Sensor and Actor Networks for the Next Generation Power Grid," Ad Hoc Networks, vol. 9, Issue 4, Jun. 2011, pp. 542-551 (2 pages).

Gungor, V. C., Lu, B. and Hancke, G. P., "Opportunities and Challenges of Wireless Sensor Networks in Smart Grid," IEEE Transactions on Industrial Electronics, vol. 57, No. 10, Oct. 2010, pp. 3557-3564.
Nasipuri, A. et al., "Demo Abstract: Wireless Sensor Network for Substation Monitoring: Design and Deployment," ResearchGate Conference Paper, Jan. 2008 (3 pages).
Detlef Zuehlke, "SmartFactory—Towards a factory-of-things." Annual Reviews in Control, 34.1, Mar. 28, 2010, pp. 129-138.
Artem Katasonov, et al., "Smart Semantic Middleware for the Internet of Things", Jan. 2008, 11 pages.
Andrea Zanella, et al., "Internet of Things for Smart Cities." IEEE Internet of Things Journal, vol. 1, Iss. 1, Feb. 2014, pp. 22-32.
Dieter Uckelmann, et al., "An Architectural Approach Towards the Future Internet of Things." Architecting the Internet of Things, Springer-Verlag Berlin Heidelberg, 2011, pp. 1-24.
Ning Zhong, et al., "Research challenges and perspectives on Wisdom Web of Things (W2T)." The Journal of Supercomputing, Nov. 26, 2010, 21 pages.
International Search Report and Written Opinion, International Application No. PCT/US2017/46991, dated Nov. 21, 2017 (8 pages).
International Search Report and Written Opinion dated May 26, 2017 in international patent application No. PCT/US2017/019434 (10 pages).
International Search Report and Written Opinion dated Dec. 9, 2016 in nternational patent application No. PCT/US2016/046509 (13 pages).
International Search Report and Written Opinion dated Dec. 19, 2016 in international patent application No. PCT/US16/50393 (11 pages).
International Search Report and Written Opinion dated Jan. 23, 2017 in international patent application No. PCT/US2016/049245 (16 pages).
International Search Report and Written Opinion dated Jan. 19, 2017 in international patent application No. PCT/US2016/058407 (16 pages).
International Search Report and Written Opinion dated Jan. 25, 2017 in international patent application No. PCT/US2016/058383 (13 pages).
St. John, Jeff, "How Utilities Could Use Virtual Reality and Google Glass to Monitor the Grid," Mar. 3, 2015, 6 pages.
Infobright, "Internet of Things Part 8: Smart Grids—the Future of Energy Delivery," 2014, 2 pages, https://www.infobright.com/index.php/internet-of-things-part-8-smart-grids-future-energy-delivery/#.VdHztvlVhBd.
Monnier, Olivier, "A Smarter Grid With the Internet of Things," Texas Instruments, Oct. 2013, 11 pages.
Jiang, R. et al., "Energy-theft detection issues for advanced metering infrastructure in smart grid," IEEE, Tsinghua Science and Technology, vol. 19, Issue 2, Apr. 15, 2014 (16 pages).
Blumsack, S. et al., Abstract of "Ready or not, here comes the smart grid!" Energy, vol. 37, Issue 1, Jan. 2012 (pp. 61-68).
McLaughlin, S. et al., "Energy theft in the advanced metering infrastructure," Abstract, Critical Information Infrastructures Security, Sep. 30, 2009 (pp. 176-187).
Amin, R. et al., "Roadmap to Smart Grid Technology: A Review of Smart Information and Communication System," International Journal of Control and Automation, vol. 7, No. 8, 2014, pp. 407-418.
Elyengui, S. et al., "The Enhancement of Communication Technologies and Networks for Smart Grid Applications," International Journal of Emerging Trends & Technology in Computer Science, vol. 2, issue 6, Nov. 2013, pp. 107-115.
Qin, Z., "A Survey of Networking Issues in Smart Grid," www.cse.wustl.edu/~jain/cse570-13/ftp/smrtgrid/index.html, Dec. 20, 2013 (12 pages).
Lockheed Martin, "Self-Powered Ad-hoc Network", http://www.lockheedmartin.com/us/products/span.html, accessed Nov. 9, 2015.
Owada, et al., "Design for Disaster-Tolerant and Dependable Network Architecture," ICMU 2012, pp. 136-141, Information Processing Society of Japan, 2012.
Morganthaler, et al., "UAVNet: A Mobile Wireless Mesh Network Using Unmanned Aerial Vehicles," available at http://rvs.unibe.ch/research/pub_files/MBZSA12.pdf, 2012.

(56) References Cited

OTHER PUBLICATIONS

Snow, "Why Drones Are the Future of the Internet of Things", Dec. 1, 2014, available at https://www.suasnews.com/2014/12/why-drones-are-the-future-of-the-internet-of-things/.

Güngör, V. et al., "Smart Grid Technologies: Communication Technologies and Standards," IEEE Transactions on Industrial Informatics, vol. 7, No. 4, Nov. 2011, pp. 529-539.

Güngör, V. et al., "A Survey on Communication Networks for Electric System Automation," Feb. 2006, available at: https://smartech.gatech.edu/bitstream/handle/1853/27879/electric_system_automation.pdf.

Zaballos, A. et al., "Heterogeneous Communication Architecture for the Smart Grid," IEEE Network, vol. 25, No. 5, Sep./Oct. 2011, pp. 30-37, available at: http://www.itk.ntnu.no/fag/TTK4545/TTK2/Pensum-filer/SmartGrid.pdf.

Clark, A. et al., "Wireless Networks for the Smart Energy Grid: Application Aware Networks," Proceedings of the International MultiConference of Engineers and Computer Scientists, vol. 2, Mar. 17-19, 2010, available at: http://www.iaeng.org/publication/IMECS2010/IMECS2010_pp1243-1248.pdf.

Parikh, P. et al., "Opportunities and Challenges of Wireless Communication Technologies for Smart Grid Applications," 2010, available at: http://citeseerx.ist.psu.edu/viewdoc/download?doi=10.1.1.453.7100&rep=rep1&type=pdf.

International Search Report dated Oct. 28, 2016 issued in counterpart international patent application No. PCT/US2016/045233 (3 pages).

Hafeez et al., "Smart Home Area Networks Protocols within the Smart Grid Context", Sep. 2014, Journal of Communications, vol. 9, No. 9, pp. 665-671.

Spinsante et al., "NFC-Based User Interface for Smart Environments", Feb. 24, 2015, Hindawi Publishing Corporation, Advances in Human-Computer Interaction, vol. 15, pp. 1-12.

Modoff et al., "Industry the Internet of Things", May 6, 2014, Deutsche Bank Markets Research, (102 pages).

Tuohy, Jennifer, "What is home automation and how do I get started", Jan. 26, 2015, Network World, (9 pages).

U.S. Appl. No. 16/372,911, filed Apr. 2, 2019, "Data Transfer Facilitation to and Across a Distributed Mesh Network Using a Hybrid TV White Space, Wi-Fi and Advanced Metering Infrastructure Construct" (43 pages).

Snyder, A.F., et al., "The ANSI C12 protocol suite—updated and now with network capabilities", Mar. 2007 (available at http://horizontec.com/sccsmartgrid.2yt4/2007-03ClemsonPSC02-snyder-mtgstuber.pdf) (6 pages).

Parag Kulkarni, et al., "A Mesh-Radio-Based Solution for Smart Metering Networks", IEEE Communications Magazine, Jul. 2012, 10 pages.

Metz, Cade, "Facebook's Massive New Antennas Can Beam Internet for Miles," https://www.wired.com/2016/04/facebooks-massive-new-antennas-can-beam-internet-miles/, Apr. 13, 2016.

Choubey, Neeraj, et al., "Introducing Facebook's new terrestrial connectivity systems—Terragraph and Project ARIES—Facembook Engineering," https://engineering.fb.com/connectivity/introducing-facebook-s-new-terrestrial-connectivity-systems-terragraph-and-project-aries/, Apr. 13, 2016.

* cited by examiner

Figure 1A: Example of Network having Residential and Commercial Structures with Transformer Monitor / Data Collector Device Figure 1B: Example of Network having Residential and Commercial Structures with Transformer Monitor / Data Collector Device Figure 2: Transformer Monitor / Data Collector Device

Apparatus 100, including a transformer monitor, communication and data collection device

> Signal processor or processing module 102 configured at least to:
>
> receive signaling containing information about collected data, including some combination of electrical signaling data related to electrical signaling being processed by a transformer located and arranged in a grid network and to which the apparatus is mounted, metered data related to associated electrical signaling being provided from the transformer to a building or structure in the grid network, and other wireless network data related to other wireless network communication devices/nodes deployed in the grid network;
>
> determine corresponding signaling containing information about the collected data for transmitting back to a central location or other connection device for further processing; and/or
>
> provide corresponding signaling containing information about the collected data.

> Other signal processor circuits or components 104 that do not form part of the underlying invention, e.g., including input/output modules, one or more memory modules, data, address and control busing architecture, etc.

Figure 3

Fig 4A: Transformer Monitor / Data Collector Device Interaction with Residential and Commercial Locations.

Fig. 4B: Transformer Monitor / Data Collector Device Installation with Residential Locations.

Fig. 4C: Transformer Monitor / Data Collector Device Installation with Commercial Locations.

TRANSFORMER MONITOR, COMMUNICATIONS AND DATA COLLECTION DEVICE

CROSS REFERENCE TO RELATED APPLICATION

This application claims benefit to U.S. provisional application No. 62/203,101 (WFMB No. 756-002.002-1), filed 10 Aug. 2015, which is hereby incorporated by reference in its entirety.

The present invention forms part of, and builds on, the family of technologies disclosed in the other related applications identified below.

BACKGROUND OF THE INVENTION

1. Field of the Invention

The present invention relates to a technique for implementing a power grid network; and more particularly, the present invention relates to a method and apparatus for implementing a smart power grid network.

2. Brief Description of Related Art

Proliferation of the "Internet of Things" is driving interconnected smart systems. In particular, smart grids are following this trend though the establishment of smart energy, gas and water management. Interconnected components are now providing an unprecedented level of intelligence supporting numerous operational actions. This landscape is ushering in vast amounts of unstructured data and the need for intelligent data parsing, analysis and action systems.

However, currently there is a need within global smart grid networks, e.g., in urban and remote locations with limited electric infrastructure, for communications with transformers, residential and commercial meters and other Internet/wireless connected devices {commonly referred to as the "Internet of Things"}. These targeted locations do not have sufficient infrastructure to fully deploy a smart grid or Internet infrastructure.

SUMMARY OF THE INVENTION

The present invention represents a new and unique inclusion of wireless communications and data transmission capability into transformer monitoring modules, transformer monitoring being a core component within a so-called smart grid network. These transformer modules may be mounted directly to utility transformers in the field and include the capability to both collect and transmit information from the transformer, residential and commercial meters and other Internet/wireless connected devices. The transformer module or device according to the present invention differs from other existing technology by incorporating a transceiver, transmitter and antenna/optical network collectively within the same device to establish a wireless mesh network, collect data from other network devices deployed in the field and communicate collected data back to a central location or other connected devices.

According to some embodiments, the complete device assembly of the present invention may include four major components: (1) water proof/environmentally sealed and human factors centric housing, (2) transformer monitoring circuitry, (3) smart grid collection circuitry, and (4) radio/wireless mesh networking circuitry. By way of example, the system may be attached to the transformer via magnets built into the housing and powered from the secondary side of the transformer using hermetically sealed interconnects.

Specific Embodiments

By way of example, and according to some embodiments, the present invention may include, or take the form of, apparatus featuring a signal processor or signal processing module, configured to:
  receive signaling containing information about collected data, including some combination of electrical signaling data related to electrical signaling being processed by a transformer located and arranged in a grid network and to which the apparatus is mounted, metered data related to associated electrical signaling being provided from the transformer to a building or structure in the grid network, and other wireless network data related to other wireless network communication devices/nodes deployed in the grid network; and
  determine corresponding signaling containing information about the collected data for transmitting back to a central location or other connection device for further processing, based upon the signaling received.

According to some embodiments, the present invention may include one or more of the following features:

The apparatus may include, or take the form of, a transformer monitor, communication and data collection device, e.g., for pole or pad mounting in relation to a residential or commercial home, building or structure.

The signal processor may be configured to provide the corresponding signaling to the central location or other connection device for further processing, e.g., using an intelligent distribution analytic platform. By way of example, the intelligent distribution analytic platform may include, or take the form of, a digital data and delivery and receipt mesh network having communication nodes for exchanging information between the transformer monitor, communication and data collection device and the central location or other connection device. By way of further example, the intelligent distribution analytic platform may include, or take the form of, using a smart node power grid communication protocol for exchanging information between the communication nodes, the transformer monitor, communication and data collection device and the central location or other wireless network communication devices/nodes/end points deployed in the grid network. The transformer monitor, communication and data collection device according to the present invention is understood to be one of the communication nodes that forms part of the digital data and delivery and receipt mesh network.

The transformer monitor, communication and data collection device may include a combination of a transceiver, transmitter and an antenna/optical network configured to receive the signaling at the transducer located and arranged in the grid network and provide the corresponding signaling back to the central location or other connection device.

The transformer monitor, communication and data collection device may include a housing with a magnet, bolt, harness or other attachment for attaching the housing to a corresponding housing of the transformer located and arranged in the grid network. The housing may be waterproof and environmentally sealed and configured to contain the signal processor therein.

The housing may include a combination of an upper housing, a lower housing base and internal circuitry configured to implement transmission, reception, networking and data aggregation, and sensor input signal processing functionality.

The internal circuitry may include, or form part of, a built-in antenna/optical network that is either incorporated directly into the housing or located externally to the housing.

The building or structure may be a residential home or building, or a commercial building or structure.

The metered data may be received from an electric meter associated with the building or structure. The meter data may also include other types or kinds of metered data, e.g., including metered data from a gas meter, or a water meter, or some combination of meters.

The metered data may be received either from a single phase residential electric meter associated with a residential building, or either from a 3-phase commercial electric meter associated with a commercial structure.

The signaling may contain associated information about the distribution of the electrical signaling in the grid network.

The associated information may include distribution information about a power outage, the voltage of the electrical signaling, and/or transformer monitoring, including voltage analysis, digital rights management (DRM) or energy theft. By way of example, the transformer may provide suitable signaling to the transformer monitor, communication and data collection device containing at least part of the associate information.

The apparatus may include the central location or other connection device configured with a corresponding signal processor to receive the corresponding signaling and determine utility analyst information, e.g., that relates to a delivery substation analysis, proactive asset monitoring, distribution asset utilization, transmission and distribution (T&D) substation analysis, energy audits and analysis, load control and/or geographic localization.

The corresponding signal processor may be configured to provide power utility signaling containing information about energy conservation, load curtailment and/or a demand response for controlling a power utility.

The transformer monitor, communication and data collection device may include one or more cables configured to provide for data and device power.

The transformer monitor, communication and data collection device may include a wireless power transfer module configured for wireless power transfer via inductance or tuned magnetic resonance.

The transformer monitor, communication and data collection device may be, or take the form of, a pole mounted device that is mounted on a transformer on a utility pole, e.g., in relation to electrical energy supplied to residential homes.

Alternatively, the transformer monitor, communication and data collection device may be, or take the form of, a mounted device that is mounted on a pad transformer, e.g., in relation to electrical energy supplied to commercial buildings or structures.

The transformer monitor, communication and data collection device may be, or take the form of, a pole mounted device that is mounted on a transformer on a utility pole.

The apparatus may include, or take the form of, a digital data and delivery and receipt mesh network, e.g., consistent with that set forth herein.

The apparatus may include a global smart grid network comprised of:
  a first transformer mounted monitor, communication and data collection device having the signal processor;
  a second transformer mounted monitor, communication and data collection device having a second signal processor configured to implement signal processing functionality corresponding to the signal processor in relation to a second transformer and providing second corresponding containing corresponding information about corresponding collected data related to corresponding electrical signaling and corresponding associated electrical signaling for further processing back at the central location or other connection device; and
  either the first transformer mounted monitor, communication and data collection device provides the corresponding signaling to the second transformer mounted monitor, communication and data collection device for providing back to the central location or other connection device, or
  the second transformer mounted monitor, communication and data collection device provides the second corresponding signaling to the first transformer mounted monitor, communication and data collection device for providing back to the central location or other connection device.

The signal processor may be configured to provide the corresponding signaling to the central location or other connection device for further processing via wireless signaling, e.g., including via a cloud network.

At least part of the signaling received may be wireless signaling, or may be hardwired signaling, or may be some combination thereof.

The instant application provides a new technique that is a further development of, and builds upon, the aforementioned family of technologies set forth herein.

BRIEF DESCRIPTION OF THE DRAWING

The drawing includes the following Figures, which are not necessarily drawn to scale.

DETAILED DESCRIPTION OF THE INVENTION

The Basic Invention

In summary, and as shown in the drawing, the present invention represents a new and unique inclusion of wireless communications and data transmission capability into transformer monitoring modules 20, transformer monitoring being a core component within a so-called Smart Grid Network according to the present invention. These transformer modules may be mounted directly to utility transformers in the field and may include the capability to both collect and transmit information received in signaling provided from a transformer, residential and commercial meters and/or other communication nodes that form part of other Internet/wireless connected devices in the Smart Grid Network. The transformer module or device according to the present invention differs from other existing technology by incorporating a transceiver, transmitter and antenna/optical network collectively within the same device to both collect data from other network devices deployed in the field and communicate the collected data back to a central location or other connected devices, e.g., consistent with that disclosed herein.

Figure 1A:
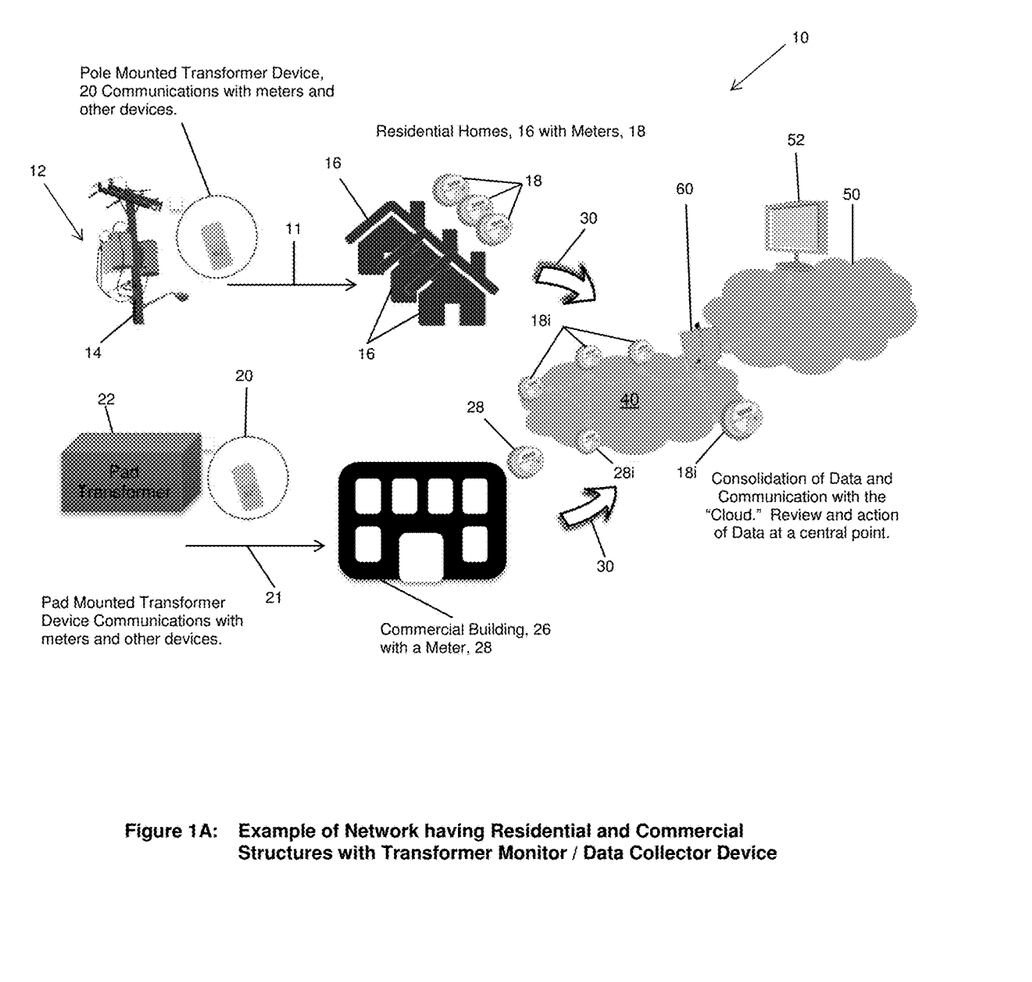
FIG. 1A is a diagram of a smart power grid network having a transformer monitor/data collection device, according to some embodiments of the present invention.
Figure 1B:
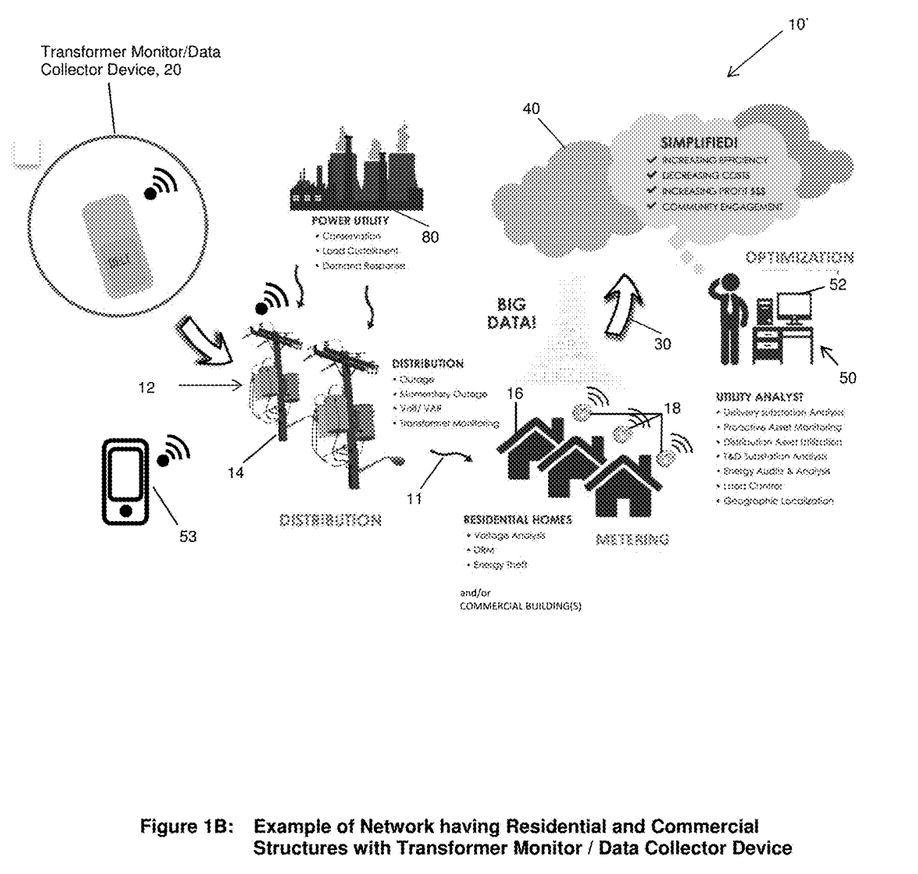
FIG. 1B is a diagram of a smart power grid network having a transformer monitor/data collection device, according to some embodiments of the present invention.
Figure 2:
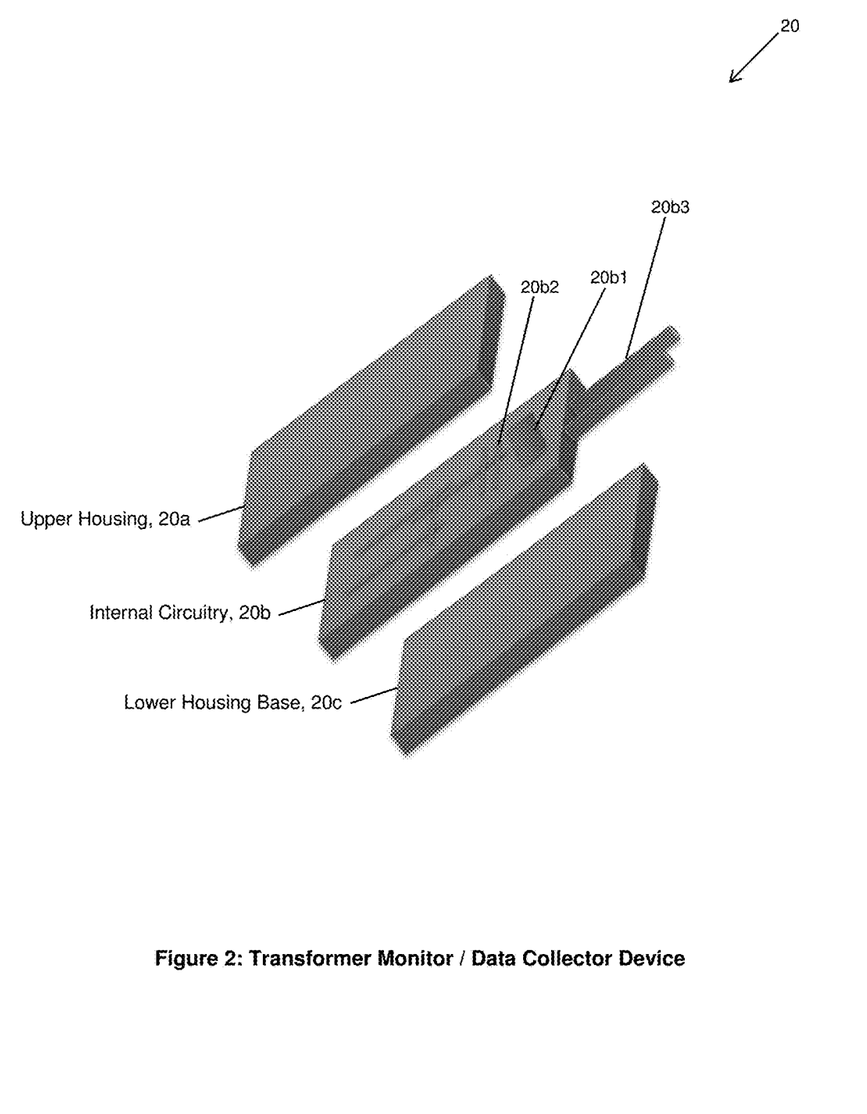
FIG. 2 is an exploded view of the transformer monitor/data collection device, according to some embodiments of the present invention.

According to some embodiments, the transformer module or device of the present invention may include four major components: water proof/environmentally sealed and human factors centric housing, transformer monitoring circuitry, smart grid collection circuitry, and radio/wireless mesh networking circuitry (See FIG. 2). By way of example, the transformer module or device may be attached to the transformer on the utility pole via magnets built into the housing and powered from the secondary side of the transformer using hermetically sealed interconnects, e.g., as shown in FIGS. 1A and 1B. See also FIGS. 4A through 4C.

FIGS. 1A and 1B show big picture renditions of the overall smart power grid network, e.g., as a configuration/establishment of a baseline, power grid centric, smart utility mesh network, for implementing a pole mounted transformer monitor/smart data collector device according to the present invention to communicate upstream/downstream within the network.

The overall smart power grid network represents an interconnected so-called "BIG DATA" technology system providing advanced intelligence and synergistic components across power metering, distribution and communication, optimization and installation and servicing. The network incorporates discrete elements in the transformer monitoring and communications, residential and commercial metering and analytical, predictive and pre-emptive software algorithms. The hardware associated with the network facilitates communications with transformers, residential and commercial meters, and other Internet/wireless connected devices {commonly referred to as the "Internet of Things"}. The network's geographically disbursed assets support a wireless mesh network communications extension, while aiding system optimization capabilities, noting that many assets are in logistically difficult areas to reference, re-locate, interrogate and service. The overall integrated system drives substantial efficiencies in data visualization, evaluation, diagnosis, optimization, and servicing using enhanced reality systems across this interconnected smart grid network and similar networks. The collective systems provide a synergistic and unique alternative network for BtB/BtC data receipt and delivery.

The smart grid network according to the present invention represents a singular, standardized, and scalable network, providing the industry's first inclusive solution from a singular supplier. The smart grid network is inclusive of four basic technology elements. The primary hardware and software constituents of the network are as noted and identified below.

1. The pole or pad mounted transformer monitor/smart data collector device is identified herein as element 20, according to the present invention (AKA as "HyperSprout™" (and formerly known as "ITM™")), which is the localized data aggregation and power flow investigation; establishing a data capture and delivery capability wherever there is power, e.g., consistent with that set forth herein.
2. A digital data and delivery and receipt mesh network (AKA "DataVINE™" (formerly known as (iAMI™")) is identified herein as element 40, which is a ubiquitous mesh network facilitating automated residential and commercial metering while deploying an alternative data delivery capability; enforcing a market leading 100% meter read capability, e.g., consistent with that set forth in U.S. application Ser. No. 62/236,420 (WFMB No. 756-2.6-1), as well as U.S. provisional application Ser. No. 62/244,919 (WFMB No. 756-2.8-1), and U.S. provisional application Ser. No. 62/299,348 (WFMB No. 756-2.10-1).
3. A smart node power grid communication protocol (AKA "DataSCAPE™" (formerly known as iDAP™)), which provides for a comprehensive nodal exchange analysis of all grid parameters; realizing an inclusive geo-spatial understanding of utility operations, e.g., consistent with that set forth in U.S. provisional application Ser. No. 62/205,358 (WFMB No. 756-2.4-1).
4. An enhanced reality field investigation, interaction and servicing; deploying the industry's first "virtual" utility (AKA as "PowerVISR™"), e.g., consistent with that set forth in U.S. provisional application Ser. No. 62/203,719 (WFMB No. 756-2.3-1).

Taken collectively, this energy and communications portfolio and financial strategy improves over current offerings through its intimate understanding of utility partners' pain points, core needs and anticipated delights. Most importantly, the network hardware and software solution allows for the identification of the purposeful diversion of energy {i.e., theft} and the focused remediation of the offending areas or subjects, subsequently enhancing enterprise revenues.

As noted, the aforementioned overall combination provides an infinitely scalable data delivery and receipt capability for communities with poorly established, historical infrastructure while providing a synergistic network capability to those communities with current cellular capability.

FIGS. 1A and 1B

By way of example, FIGS. 1A and 1B show examples of smart power grid networks generally indicated as 10 and 10', some embodiments of the present invention. By way of example, the smart power grid networks may take the form of, or may be configured to include, one or more digital data and delivery and receipt mesh networks like element 40. Each digital data and delivery and receipt mesh network 40 includes communication nodes such as the transformer module or device 20 for exchanging information upstream and downstream between the communication nodes and the central location, which takes the form of the private network 50 in FIGS. 1A and 1B. Communication nodes are configured to be able exchange such upstream and downstream information between themselves in order to exchange such upstream and downstream information between a respective communication node and the central location. In FIGS. 1A and 1B, similar elements are provided with similar reference labels.

In FIGS. 1A and 1B, the smart power grid networks 10, 10' include transformers like elements 12, 22 for providing electric energy to residential homes and commercial buildings like elements 16, 26, each having a respective electrical meter like elements 18, 28 for measuring the associated electrical energy usage. The smart power grid networks 10, 10' also include transformer monitor/data collection devices 20 configured to collect data about the electrical energy usage in relation to residential homes and commercial buildings 16, 26 from the respective electrical meter like elements 18, 28. For example, each electrical meter 18, 28 may provide metered data signaling containing information about metered data related to associated electrical signaling being supplied from the transformer 12, 22 to the building or structure 16, 26 in the grid network 10, 10'. Moreover, transformer monitor/data collection devices 20 may receive associated signaling containing information about electrical signaling data related to electricity being processed by the transformer 12, 22 located and arranged in the grid network and to which the transformer monitoring device is mounted, as well as other wireless network data related to other communication nodes/end points forming part of other wireless network devices deployed in the grid network. In effect, the collected data received by the transformer monitor device 20 may include some combination of the electrical signaling data related to the transformer, the metered data related to the electrical meter and/or the other wireless network data related to other communication nodes/end points in the grid network.

The transformer monitor/data collection devices 20 are also configured to provide suitable signaling 30 containing information about the collected data to a private network 50 via the digital data and delivery and receipt mesh network 40. The private network 50 is configured as a central point that processes the collected data, e.g., performing utility analysis that may include one or more of the following: delivery subtraction analysis, proactive asset monitoring, distribution asset utilization, T and D subtraction analysis, energy audits and analysis, load control, and geographic localization. By way of example, the utility analysis is performed in an effort to increase efficiency, decrease costs, increase profits and/or community engagement related to the operation of the smart grid network.

FIGS. 1A and 1B shows a pole mounted transformer device 20 in communications with the electrical meter 18 associated with the residential home 16. By way of example, the electrical meter 18 may be configured to measure single phase electrical energy provided by the transformer 12 along a single phase utility line 11 to the residential home 16.

FIG. 1A also shows a pad mounted transformer device 20 in communications with the electrical meter 28 associated with the commercial building home 26. By way of example, the electrical meter 28 may be configured to measure three (3) phase electrical energy provided by the pad transformer 22 along a three (3) phase utility line 21 to the commercial building home 26. FIG. 1B also shows a power utility 80 configured to provide the electrical energy in the smart grid network 10'.

FIG. 1B shows that the transformer device 20 may be configured to collect data related to some distribution related functionality, e.g., including determinations related to outage, momentary outage, voltage/VAR, and/or transformer monitoring. FIG. 1B shows that the transformer device 20 may be configured to collect data related to some voltage analysis, DRM functionality and energy theft functionality in relation to its associated residential home or commercial building. The transformer device 20 provides the suitable signaling 30 containing information about the collected data to the private network 50 via the digital data and delivery and receipt mesh network 40. The collected data received by the private network 50 may also be analyzed in relation to conservation, load curtailment and/or a demand response vis-a-vis the power utility 80. In FIG. 1B, the private network 50 may include a private network computer and monitor generally indicated as 52 for performing or implementing the aforementioned analysis and functionality. FIG. 1B also shows both the receipt and transmission of digital data across the defined wireless mesh network to a representative IoT device indicated as 53, e.g., which may take the form of a smart phone, tablet, computer, laptop, etc.

FIG. 1A shows that the digital data and delivery and receipt mesh network 40 may include other transformer devices like element 20 exchanging information with other meters like elements 18i, 28i associated with other buildings or structures like elements 16, 26.

FIG. 1A also shows a relay 60 coupled between the digital data and delivery and receipt mesh network 40 and the private network 50. By way of example, the relay 60 is shown as 5 GHz relay for communicating with a corresponding 5 GHZ private network 50, although the scope of the invention is not intended to be limited to any particular frequency or transmissions/receipt media for the relay or network.

FIG. 2

FIG. 2 shows the transformer monitor/data collection device 20, e.g., having an upper housing 20a, internal circuitry 20b and a lower housing base 20c. By way of example, the internal circuitry 20c may be configured inclusive of transmission, reception, networking, data aggregation, sensor input, among other requirements for implementing signal processing functionality in relation to the same. For example, any signal processing functionality may be implemented using a signal processor like element 20b1 (see also FIG. 3, element 102), consistent with that set forth herein and described in further detail below.

In particular, the internal circuitry 20b may be configured to implement transmission/reception signal processing functionality, e.g., for exchanging suitable transmission/reception signaling to/from other communication nodes in the smart grid network, or to/from the central location or other connection device like element 50 for further processing, including in relation to some combination of either a cloud network, or a digital data and delivery and receipt mesh network 40, or by using a smart node power grid communication protocol, consistent with that set forth herein.

Further, the internal circuitry 20b may also be configured to implement networking and data aggregation signal processing functionality, e.g., for exchanging suitable networking and data aggregation signaling received to/from other communication nodes in the smart grid network, or to/from the central location or other connection device for further processing, including in relation to some combination of either the cloud network, or the digital data and delivery and receipt mesh network, or by using the smart node power grid communication protocol.

Furthermore, the internal circuitry 20b may also be configured to implement sensor input signal processing functionality, e.g., for exchanging suitable sensor input signaling containing information about sensed input information received by the transformer monitor/data collection device 20 to/from the electric meter 18, 28 of the residential home or commercial building, or to/from the transformer itself 12, 22. Furthermore still, the scope of the invention is not intended to be limited to any particular type or kind of signal processing functionality that may be implemented by the internal circuitry 20b; embodiments are envisioned, and the scope of the invention is intended to include, implementing other types or kind of signal processing functionality by the internal circuitry 20b either now known or later developed in the future within the spirit of the present invention.

The housing base 20c may be attached to the pole-mounted transformer or the utility pole 14 itself (see FIGS. 1A and 1B), e.g., by being configured for magnetic attachment, bolt attachment, or other methodologies. The scope of the invention is not intended to be limited to the type or kind of attachment; and embodiments are envisioned using, and the scope of the invention is intended to include, other types or kinds of attachment techniques either now known or later developed in the future within the spirit of the present invention.

The upper housing 20a and the lower housing base 20c may be combined together to form an assembled housing having the internal circuitry 20b therein. By way of example, the assembled housing may be hermetically sealed against the ingress of environmental elements, e.g., like water, moisture, etc. All interconnect ports may be sealed. The assembled housing may be configured to provide protection for reducing electromagnetic interference (EMI), e.g., from the transformer itself or other EMI emitting devices within range. The assembled housing may also be configured for easy transport, attachment, detachment and decommissioning, e.g., in relation to a utility pole or some other structure.

The transformer monitor/data collection device 20 may include an antenna/optical network 20b2 built into the internal circuitry 20b, or alternatively incorporated directly into either housing 20a or 20c, or alternatively located external to the housing assembly. Techniques for implementing a built-in antenna/optical network like element 20b2 into internal circuitry like element 20b, for incorporating an antenna/optical network directly into a housing like elements 20a or 20c, or for locating an external antenna/optical network to a housing assembly are known in the art, and the scope of the invention is not intended to be limited to any particular type or kind thereof either now known or later developed in the future.

In the transformer monitor/data collection device 20, external cables 20b3 may be configured for data and/or device power. Alternatively, the transformer monitor/data collection device 20 may also have an accommodation for wireless power transfer via inductance or tuned magnetic resonances. These data and power functionalities are provided by way of example; and the scope of the invention is not intended to be limited to the type or kind of data or power functionality implementation; and embodiments are envisioned using, and the scope of the invention is intended to include, other types or kinds of data or power functionality implementation either now known or later developed in the future within the spirit of the present invention.

Figure 3:
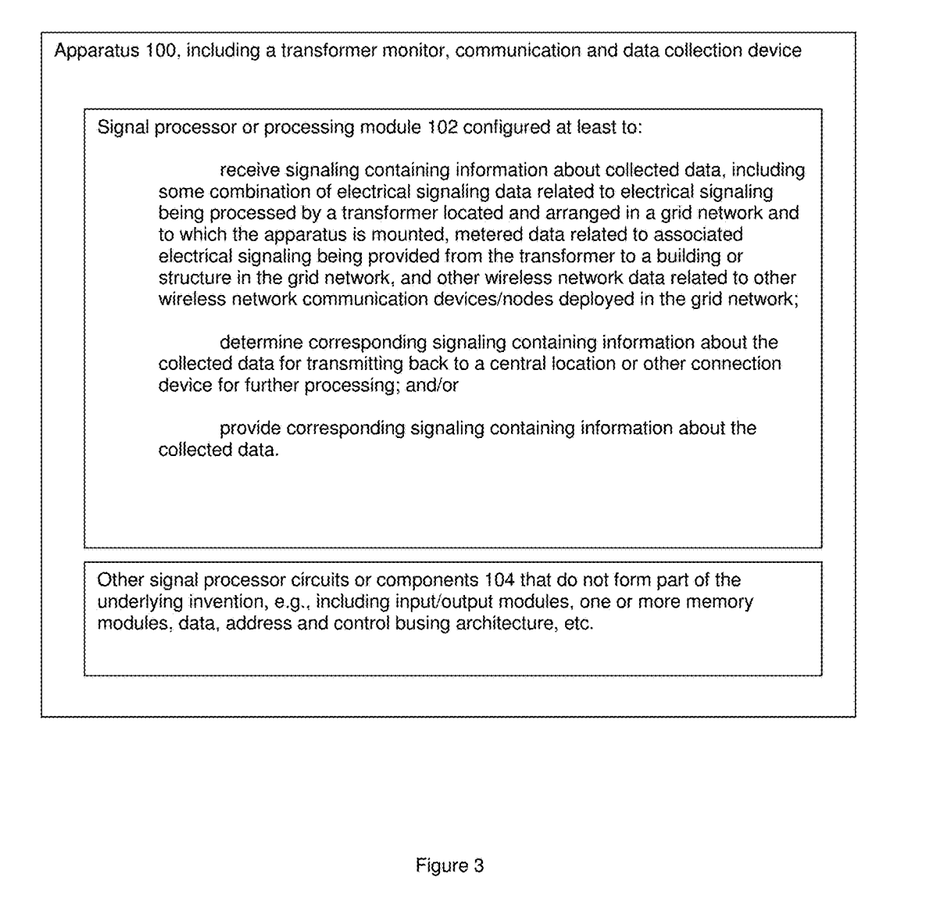
FIG. 3 is a block diagram of apparatus, e.g., having a signal processor or processing module, configured for implementing signal processing functionality associated with the present invention, according to some embodiments of the present invention.

FIG. 3: Implementation of Signal Processing Functionality

By way of example, FIG. 3 shows apparatus 100 according to some embodiments of the present invention, e.g., featuring a signal processor or processing module 102 configured at least to:
  receive wireless signaling containing information about collected data, including some combination of electrical signaling data related to electrical signaling being processed by a transformer located and arranged in a grid network and to which the apparatus is mounted, metered data related to associated electrical signaling being provided from the transformer to a building or structure in the grid network, and other wireless network data related to other wireless network communication devices/nodes deployed in the grid network; and
  determine corresponding signaling containing information about collected data for transmitting back to a central location or other connection/communication device for further processing, based upon the signaling received In operation, the signal processor or processing module may be configured to provide corresponding signaling containing information about the collected data for transmitting back to a central location or other connection device for further processing.

By way of example, the functionality of the apparatus 100 may be implemented using hardware, software, firmware, or a combination thereof. In a typical software implementation, the apparatus 100 may include one or more microprocessor-based architectures, e.g., having at least one signal processor or microprocessor like element 102. A person skilled in the art would be able to program with suitable program code such a microcontroller-based, or microprocessor-based, implementation to perform the functionality described herein without undue experimentation.

Moreover, and by way of further example, the signal processor or processing module 102 may be configured, e.g., by a person skilled in the art without undue experimentation, to receive the signaling containing information about the collected data, including some combination of the electrical signaling data related to the electrical signaling being processed by the transformer located and arranged in the grid network and to which the apparatus is mounted, the metered data related to the associated electrical signaling being provided from the transformer to the building or structure in the grid network, and the other wireless network data related to the other wireless network communication devices/nodes deployed in the grid network, consistent with that disclosed herein.

Moreover still, and by way of still further example, the signal processor or processing module 102 may be configured, e.g., by a person skilled in the art without undue experimentation, to determine the corresponding signaling containing information about the collected data for transmitting back to the central location or other connection device for further processing, based upon the signaling received, consistent with that disclosed herein.

The scope of the invention is not intended to be limited to any particular implementation using technology either now known or later developed in the future. The scope of the invention is intended to include implementing the functionality of the processors 102 as stand-alone processor, signal processor, or signal processor module, as well as separate processor or processor modules, as well as some combination thereof.

The apparatus 100 may also include, e.g., other signal processor circuits or components 104, including random access memory or memory module (RAM) and/or read only memory (ROM), input/output devices and control, and data and address buses connecting the same, and/or at least one input processor and at least one output processor, e.g., which would be appreciate by a person skilled in the art.

Figure 4A:
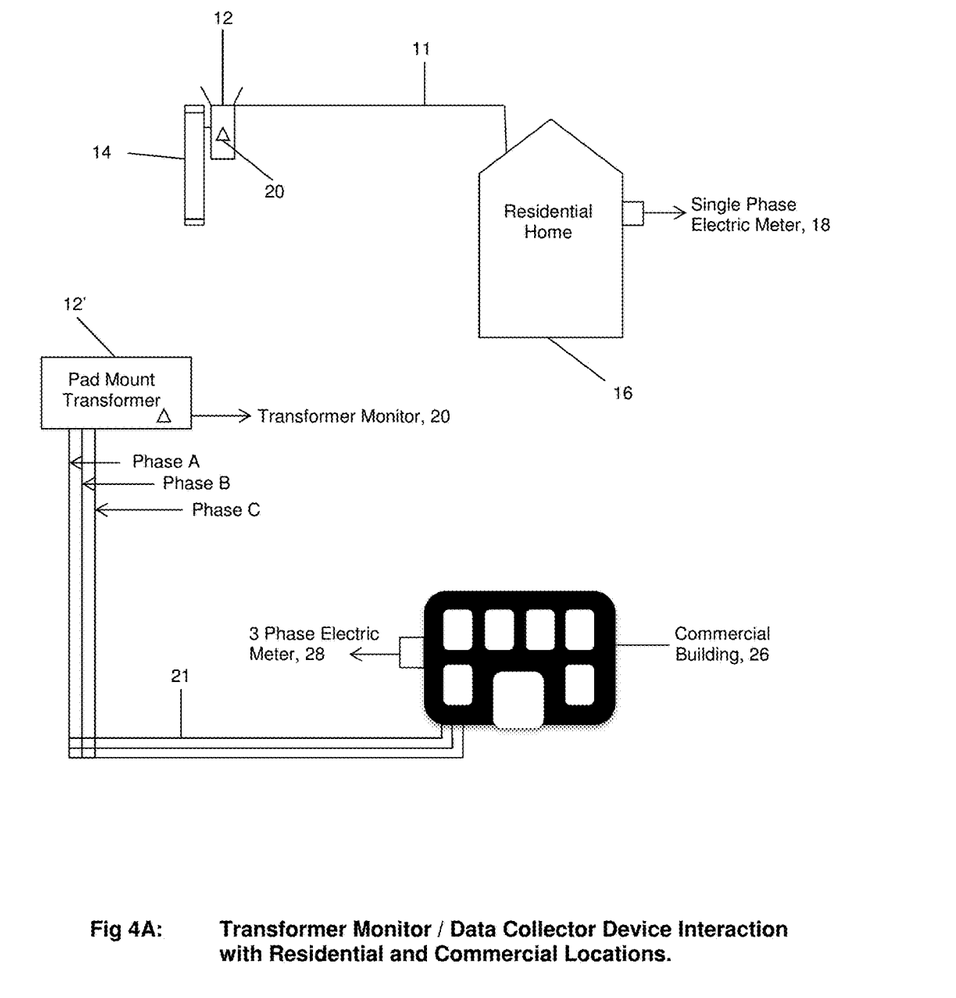
FIG. 4A shows a transformer monitor/data collection device interaction with residential and commercial locations, according to some embodiments of the present invention.
Figure 4B:
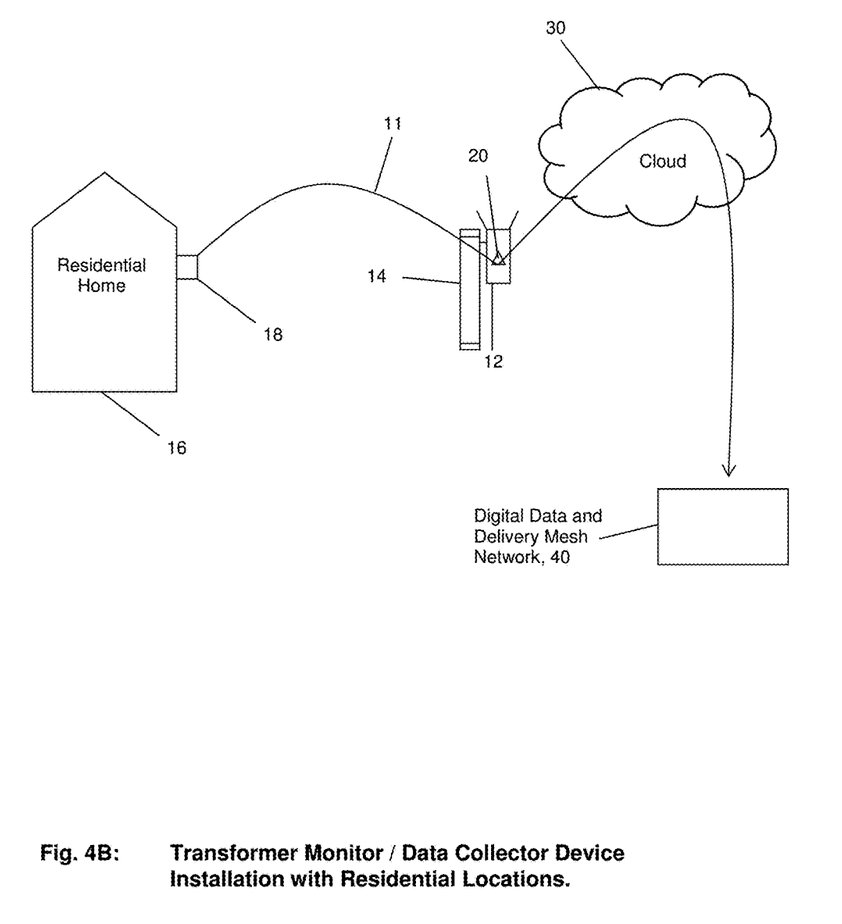
FIG. 4B shows a transformer monitor/data collection device installation with residential locations and connected via a cloud network, e.g., to a communication node that forms part of a digital data and delivery and receipt mesh network using a smart node power grid communication protocol, according to some embodiments of the present invention.
Figure 4C:
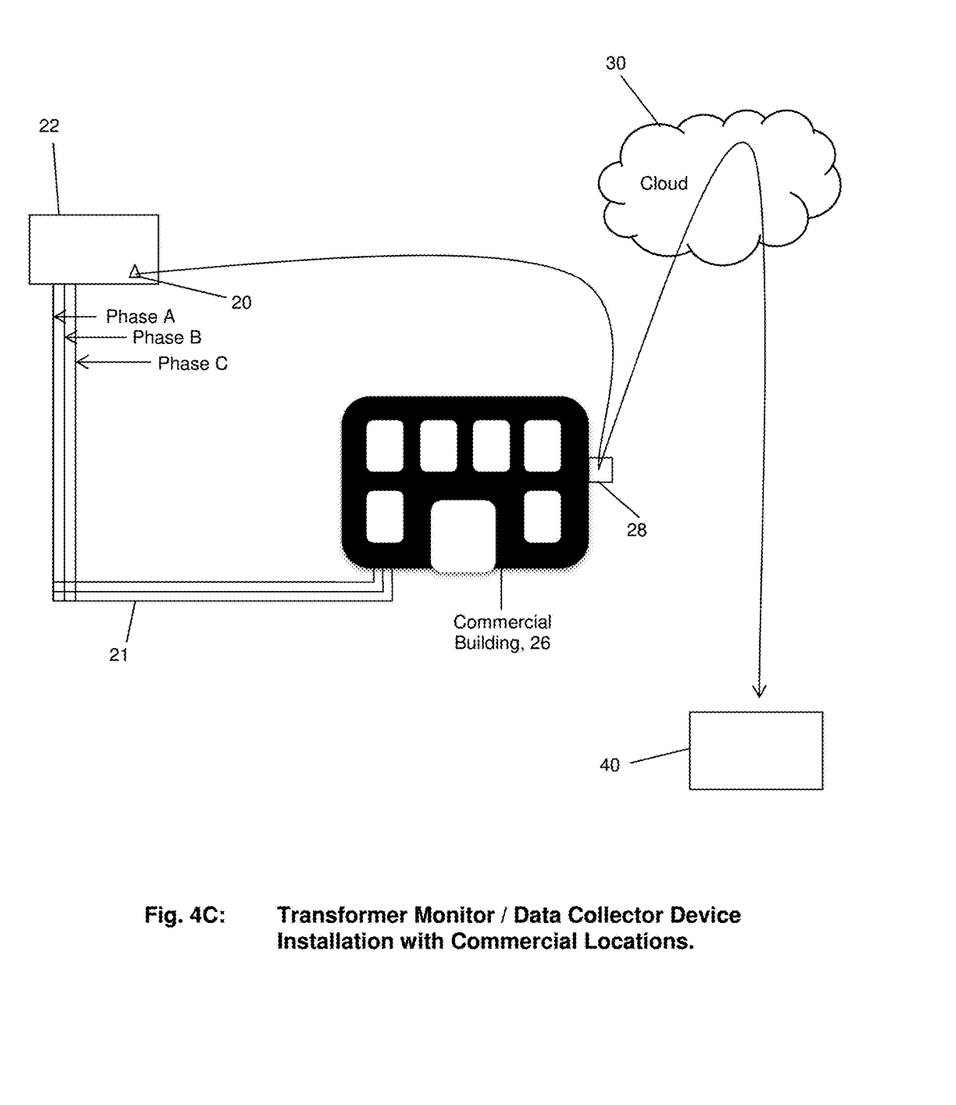
FIG. 4C shows a transformer monitor/data collection device installation with commercial locations and connected via a cloud network, e.g., to a communication node that forms part of a digital data and delivery and receipt mesh network using a smart node power grid communication protocol, according to some embodiments of the present invention.

FIG. 4

In summary, FIGS. 4A though 4C that show the basic operation of the present invention, according to some embodiments. FIG. 4A shows the transformer monitor/data collection device 20 in interaction with residential and commercial locations, according to some embodiments of the present invention.

Residential Home

By way of example re a residential location, FIGS. 4A and 4B show a residential transformer 12 arranged on a utility pole 14 that supplies electric power to a residential home 16, where electrical energy is measured by an electric meter 18. In FIGS. 4A and 4B, the pole top residential transformer 12 may take the form of a single phase residential transformer, and the electric meter 18 may be configured as a single phase electric meter. The electric meter 18 may also be configured to provide electric meter signaling containing information about the amount of electricity used by the residential home 16. The electric meter 18 may be configured to provide such electric meter signaling to the transformer monitor/smart data collector device 20 in a data structure that is presently known in the art. Alternatively, the electric meter 18 may be configured to form part of a digital data and delivery and receipt mesh network like element 50, according to the present invention, and may be configured to provide such electric meter signaling to the transformer monitor/smart data collector device 20 in a data structure that is consistent with the data structure protocol of the digital data and delivery and receipt mesh network, according to the present invention. By way of example, the data structure protocol may include, or take the form of, the smart node power grid communication protocol, consistent with that disclosed herein By way of example, the digital data and delivery and receipt mesh network may be configured like that shown in FIGS. 1A and 1B. In FIGS. 4A and 4B, the utility pole mounted transformer monitor/smart data collector device 20 may be coupled to the pole top residential transformer 12, according to the present invention. FIGS. 4A and 4B also show a single phase utility line 11 configured to couple the residential home 16 and the single phase electric meter 18 to the residential transformer 12 and the pole mounted transformer monitor/smart data collector device 20, e.g., providing power from the single phase electricity from the residential transformer 12 to the residential home 16, and also providing meter data signaling containing information about meter data from the residential home 16 back to the pole mounted transformer monitor/smart data collector device 20. In operation, the pole mounted transformer monitor/smart data collector device 20 monitors the power flow of electrical energy through the residential home 16 to the electrical meter 18. FIGS. 4A and 4B also show that the pole mounted transformer monitor/smart data collector device 20 also collects the meter data received back from the electrical meter 18 and transmits the meter data in data packets wirelessly over the air to a cloud-based analytic platform 30, for cooperating with, and exchanging the collected data to, the digital data and delivery and receipt mesh network 40, e.g., using the smart node power grid communication protocol, as shown in FIG. 4B.

Commercial Building

By way of further example re a commercial location, FIGS. 4A and 4C show a corresponding transformer monitor/smart data collector device 20 for a commercial building using three (3) phases (e.g., labeled phase A, B and C) of power also monitors the power flow to such a commercial building.

In FIGS. 4A and 4C, the commercial location includes a transformer 22 that is shown as a pad mounted transformer for mounting in relation to some part of the commercial building 16. The transformer 22 is shown as a three phase commercial transformer having the corresponding transformer monitor/smart data collector device 20 coupled thereto, according to the present invention. FIGS. 4A and 4C also show the commercial building 16 having a three phase electric meter 28 that is coupled to the three phase commercial transformer 22 and the transformer monitor/smart data collector device 20 via a three phase utility line 21 that may include a meter data line for providing the meter data, according to the present invention. In operation, the mounted transformer monitor/smart data collector device 20 monitors the power flow of electrical energy through the commercial building to the electrical meter 28. In FIGS. 4A and 4C, the three phase utility line 21 may be configured so that the meter data line provides meter data signaling containing information about meter data from the commercial building 26 back to the transformer monitor/smart data collector device 20. In FIGS. 4A and 4C, the transformer monitor/smart data collector device 20 may also act as a data collector to transmit the power used back to such a cloud-based analytic platform for cooperating with, and exchanging the collected data to, the digital data and delivery and receipt mesh network 40, e.g., using the smart node power grid communication protocol, as shown in FIG. 4B.

Other Related Applications

The application is related to other patent applications, some of which are identified above, that together form part of the overall family of technologies developed by one or more of the inventors herein, and disclosed in the following applications:

U.S. provisional application Ser. No. 62/203,719 (WFMB No. 756-2.3-1), filed 11 Aug. 2015, entitled "Enhanced reality system for visualizing, evaluating, diagnosing, optimizing and servicing smart grids and incorporated components;"

U.S. provisional application Ser. No. 62/205,358 (WFMB No. 756-2.4-1), filed 14 Aug. 2015, entitled "Integrated solution of Internet of Things, DSGN™, and iDAP™ pertaining to Communication, Data and Asset Serialization, and Delta Data Modeling Algorithms;"

U.S. provisional application Ser. No. 62/213,815 (WFMB No. 756-2.5-1), filed 3 Sep. 2015, entitled "Novel application of line loss revenues for smart grid purchase and installation financing using proprietary analytics systems and hardware;"

U.S. application Ser. No. 62/236,420 (WFMB No. 756-2.6-1), filed 2 Oct. 2015, entitled "Supplemental and alternative digital data delivery and receipt mesh network realized through the placement of enhanced transformer mounted monitoring devices;"

U.S. provisional application Ser. No. 62/244,914 (WFMB No. 756-2.7-1), filed 22 Oct. 2015, entitled "Augmentation, expansion and self-healing of a geographically distributed mesh network using unmanned aerial vehicle (UAV) technology;"

U.S. provisional application Ser. No. 62/244,919 (WFMB No. 756-2.8-1), filed 22 Oct. 2015, entitled "Data transfer facilitation across a distributed mesh network using light and optical based technology;" and

[7] U.S. provisional application Ser. No. 62/299,348 (WFMB No. 756-2.10-1), filed 24 Feb. 2016, entitled "Distributed 802.11s mesh network using hypersprout hardware for the capture and transmission of data;"

which are all assigned to the assignee of the instant patent application, and which are all incorporated by reference in their entirety.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

What we claim is:

1. An apparatus comprising:
   internal circuitry comprising transformer monitoring circuitry, smart grid collection circuitry, and radio, optical or other wireless mesh networking circuitry, the internal circuitry configured to:
   receive signaling containing information about collected data, including:
   electrical signaling data from a transformer related to electricity being processed by the transformer located and arranged in a grid network,
   metered data from at least one electric meter related to associated electrical signaling being provided from the transformer to a building or structure in the grid network, and
   other wireless network data from other wireless network communication devices deployed in and around the grid network, the other wireless network data being unrelated to the electricity being processed by the transformer and unrelated to the metered data; and
   determine the signaling containing the information about the collected data for transmitting back to a central location or other connection device for further processing, based upon the signaling received;
   wherein the internal circuitry is configured to establish a wireless mesh network accessible to the other wireless network communication devices, collect the other wireless network data from the other wireless network communication devices deployed in the wireless mesh network and communicate the collected other wireless network data back to the central location or the other connection device, wherein the wireless mesh network established by the apparatus further comprises the at least one electric meter and the other wireless network communication devices as communication nodes in the wireless mesh network which are configured to exchange the signaling received from the apparatus between themselves in the wireless mesh network and configured to exchange the signaling directed towards the apparatus between themselves in the wireless mesh network;
   wherein the wireless mesh network established by the apparatus is configured to provide Internet connectivity capability to the other wireless network communication devices.

2. The apparatus according to claim 1, wherein the internal circuitry is further configured to backhaul the signaling to the central location or the other connection device for further processing, including where the signaling is wireless signaling.

3. The apparatus according to claim 2, wherein the apparatus is a transformer monitor, communication and data collection device comprising:
   a transceiver, a transmitter and the internal circuitry configured to backhaul.

4. The apparatus according to claim 3, wherein the transformer monitor, communication and data collection device comprises a housing with a magnet or bolt attachment for attaching the housing to a corresponding housing of the transformer located and arranged in the grid network.

5. The apparatus according to claim 3, wherein the transformer monitor, communication and data collection device comprises a housing that is waterproof and environmentally sealed and that contains the internal circuitry therein.

6. The apparatus according to claim 3, wherein the transformer monitor, communication and data collection device comprises an upper housing, a lower housing base and the internal circuitry configured to implement transmission, reception, networking and data aggregation, and sensor input signal processing functionality.

7. The apparatus according to claim 6, wherein the internal circuitry further includes, or forms part of, a built-in antenna and optical network that is either incorporated directly into the upper housing or the lower housing base or located externally to the upper housing or the lower housing base.

8. The apparatus according to claim 3, wherein the transformer monitor, communication and data collection device comprises one or more cables configured to provide for data and device power.

9. The apparatus according to claim 3, wherein the transformer monitor, communication and data collection device comprises a wireless power transfer module configured for wireless power transfer via inductance or tuned magnetic resonance.

10. The apparatus according to claim 3, wherein the transformer monitor, communication and data collection device is configured to receive digital data from and transmit digital data to the other wireless network communication devices, and wherein the other wireless network communication devices comprise one or more of a smart phone, tablet, computer, laptop, set-top box, home automation device, or other digital device.

11. The apparatus according to claim 3, wherein the wireless mesh network is configured to provide Internet connectivity capability to the other wireless network communication devices deployed in the wireless mesh network.

12. The apparatus according to claim 3, wherein the transformer monitor, communication and data collection device is a central node for aggregating data from each of the wireless network communication devices in the wireless mesh network, which comprises the at least one electric meter, and the other wireless network communication devices comprise one or more of a smart phone, tablet, computer, laptop, set-top box, home automation device, or other digital device.

13. The apparatus according to claim 2, wherein the internal circuitry is further configured to provide the signaling to the central location or the other connection device for further processing via wireless signal, including via a cloud network.

14. The apparatus according to claim 1, wherein the metered data is received from the at least one electric meter associated with the building or structure, a gas meter, or a water meter.

15. The apparatus according to claim 14, wherein the metered data is received either from a single phase residential electric meter associated with a residential building, or a three-phase commercial electric meter associated with a commercial structure.

16. The apparatus according to claim 1, wherein the signaling further comprises associated information about a distribution of the associated electrical signaling in the grid network.

17. The apparatus according to claim 16, wherein the associated information includes distribution information about a power outage, a voltage of the associated electrical signaling, and/or transformer monitoring, including voltage analysis, digital rights management (DRM) or energy theft.

18. The apparatus according to claim 17, wherein the apparatus comprises the central location or the other connection device configured with a corresponding signal processor to receive the signaling and determine utility analyst information that relates to a delivery substation analysis, proactive asset monitoring, distribution asset utilization, transmission and distribution (T&D) substation analysis, energy audits and analysis, load control and/or geographic localization.

19. The apparatus according to claim 18, wherein the corresponding signal processor is configured to provide power utility signaling containing information about conservation, load curtailment and/or a demand response for controlling a power utility.

20. The apparatus according to claim 1, wherein the apparatus is a node in the wireless mesh network comprising:
- a first transformer mounted monitor, communication and data collection device having the internal circuitry;
- a second transformer mounted monitor, communication and data collection device having a second internal circuitry configured to implement signal processing functionality corresponding to the internal circuitry in relation to a second transformer and providing second corresponding signaling containing second corresponding information about second corresponding collected data related to second corresponding electrical signaling and second corresponding associated electrical signaling for further processing back at the central location or the other connection device; and
- either the first transformer mounted monitor, communication and data collection device provides the signaling to the second transformer mounted monitor, communication and data collection device for providing back to the central location or the other connection device, or the second transformer mounted monitor, communication and data collection device provides the second corresponding signaling to the first transformer mounted monitor, communication and data collection device for providing back to the central location or the other connection device.

21. The apparatus according to claim 1, wherein the other wireless network communication devices comprise one or more of a smart phone, tablet, computer, laptop, set-top box, home automation device, or other digital device.

22. The apparatus according to claim 1, wherein the other wireless network communication devices comprise one or more of a smart phone, tablet, computer, laptop, set-top box.

* * * * *